US010817345B2

(12) United States Patent
Arrasjid et al.

(10) Patent No.: US 10,817,345 B2
(45) Date of Patent: Oct. 27, 2020

(54) DISTRIBUTED LEDGER FOR MONITORING QUALITY OF SERVICES PROVIDED BY CLOUD SERVICE PROVIDERS

(71) Applicant: Virtustream IP Holding Company LLC, Bethesda, MD (US)

(72) Inventors: John Yani Arrasjid, Boulder Creek, CA (US); Luc C. Russell, Webster, NY (US)

(73) Assignee: Virtustream IP Holding Company LLC, Bethesda, MD (US)

( * ) Notice: Subject to any disclaimer, the term of this patent is extended or adjusted under 35 U.S.C. 154(b) by 0 days.

(21) Appl. No.: 16/257,627

(22) Filed: Jan. 25, 2019

(65) Prior Publication Data

US 2020/0241929 A1    Jul. 30, 2020

(51) Int. Cl.
*G06F 9/50* (2006.01)
*G06F 9/455* (2018.01)
(Continued)

(52) U.S. Cl.
CPC ........ *G06F 9/5072* (2013.01); *G06F 9/45558* (2013.01); *G06F 9/5077* (2013.01); *G06Q 20/065* (2013.01); *H04L 9/0637* (2013.01); *H04L 9/0861* (2013.01); *H04L 9/3228* (2013.01); *H04L 9/3242* (2013.01); *H04L 9/3247* (2013.01); *H04L 41/5016* (2013.01);
(Continued)

(58) Field of Classification Search
CPC .. H04L 9/3247; H04L 9/3236; H04L 2209/38
USPC ........ 709/220, 223, 226, 227, 231; 713/153, 713/155, 168, 171
See application file for complete search history.

(56) References Cited

U.S. PATENT DOCUMENTS 9,577,911 B1 * 2/2017 Castleman ............ H04L 41/046
10,673,618 B2 * 6/2020 Suthar .................. G06Q 20/403
(Continued)

OTHER PUBLICATIONS

"The Economics of Distributed Ledger Technology for Securities Settlement"—Benos et al, Bank of England, Aug. 2017 https://www.bankofengland.co.uk/-/media/boe/files/working-paper/2017/the-economics-of-distributed-ledger-technology-for-securities-settlement.pdf?la=en&hash=17895E1C1FEC86D37 (Year: 2017).*
(Continued)

*Primary Examiner* — Randy A Scott
(74) *Attorney, Agent, or Firm* — Ryan, Mason & Lewis, LLP

(57) ABSTRACT

An apparatus in one embodiment comprises at least one processing device having a processor coupled to a memory configured to implement a first ledger node of a plurality of ledger nodes configured to collectively maintain a distributed ledger. The first ledger node is configured to obtain a set of quality of service metrics for a given workload running on a given cloud service provider, to receive a set of monitoring metrics for the given workload, and to generate a cryptographic block characterizing the set of monitoring metrics, the cryptographic block being entered into the distributed ledger. The first ledger node is also configured to verify whether the given workload meets the set of quality of service metrics based at least in part on the set of monitoring metrics, and to trigger release of resources from a given client device to the given cloud service provider responsive to successful verification.

20 Claims, 8 Drawing Sheets

(51) Int. Cl.
  *H04L 12/24*  (2006.01)
  *H04L 12/26*  (2006.01)
  *G06Q 20/06*  (2012.01)
  *H04L 9/08*  (2006.01)
  *H04L 9/32*  (2006.01)
  *H04L 9/06*  (2006.01)

(52) U.S. Cl.
  CPC ...... *H04L 41/5029* (2013.01); *H04L 41/5054* (2013.01); *H04L 43/08* (2013.01); *G06F 2209/508* (2013.01); *H04L 2209/38* (2013.01)

(56) References Cited

U.S. PATENT DOCUMENTS

| | | | | |
|---|---|---|---|---|
| 2016/0191343 | A1* | 6/2016 | Dong | G06F 9/5083 709/226 |
| 2016/0357550 | A1* | 12/2016 | Thomas | G06F 21/52 |
| 2017/0344983 | A1* | 11/2017 | Muftic | G06Q 20/407 |
| 2019/0102850 | A1* | 4/2019 | Wheeler | G06Q 20/102 |
| 2019/0245688 | A1* | 8/2019 | Patin | H04L 9/0869 |
| 2020/0007511 | A1* | 1/2020 | Van de Groenendaal | G06F 8/65 |

OTHER PUBLICATIONS

A. Kupcu et al., "Usable Optimistic Fair Exchange," https://eprint.iacr.org/2008/431.pdf, 2010, 25 pages.

M. Al-Bassam et al., "Airtnt: Fair Exchange Payment for Outsourced Secure Enclave Computations," https://arxiv.org/pdf/1805.06411.pdf, May 16, 2018, 12 pgs.

A. Bottoni et al., "A Methodology for Verification of Digital Items in Fair Exchange Protocols with Active Trustee," Electron Commerce Res, https://www.researchgate.net/publication/220480841_A_methodology_for_verification_of_digital_items_in_fair_exchange_protocols_with_active_trustee/download—, May 2007, 23 pages.

S. Bhardwaj et al., "Cloud Computing: A Study of Infrastructure as a Service (IAAS)," International Journal of Engineering and Information Technology (IJEIT), 2010, pp. 60-63, vol. 2, No. 1.

E. Benos et al., "The Economics of Distributed Ledger Technology for Securities Settlement," Bank of England Staff Working Paper No. 670, https://papers.ssrn.com/sol3/papers.cfm?abstract_id=3023779, Aug. 2017, 33 pages.

Satoshi Nakamoto, "Bitcoin: A Peer-to-Peer Electronic Cash System," http://bitcoin.org/bitcoin.pdf, 2008, 9 pages.

K.D. Bowers et al., "Proofs of Retrievability: Theory and Implementation," http://www.arijuels.com/wp-content/uploads/2013/09/BJO09b.pdf, 2013, 24 pages.

M. Campanelli et al., "Zero-Knowledge Contingent Payments Revisited: Attacks and Payments for Services," Proceedings of the ACM SIGSAC Conference on Computer and Communications Security (CCS), Oct. 30-Nov. 3, 2017, pp. 229-243.

vmware.com, "VMWare Blockchain," https://research.vmware.com/projects/vmware-blockchain, Nov. 26, 2018, 13 pages.

azure.microsoft.com, "Microsoft Azure Blockchain," https://azure.microsoft.com/en-us/solutions/blockchain, Nov. 26, 2018, 19 pages.

www.ibm.com, "Hyperledger: Blockchain Collaboration Changing the Business World," https://www.ibm.com/blockchain/hyperledger, Jan. 23, 2019, 4 pages.

H. Krawczykj et al., "HMAC: Keyed-Hashing for Message Authentication," Network Working Group, Request for Comments: 2104, Feb. 1997, 11 pages.

* cited by examiner

Algorithm 1: Validate metrics against SLA

/* metricList contains the latest metrics from the customer agent                                                   */
1 foreach m in metricList do
    /* sla is a table of metrics defining the SLA conditions */
2     if m in sla then
3         if m ≥ sla then
4             send(provider);
5         else
6             send(customer);
7     end
8 end

FIG. 5

DISTRIBUTED LEDGER FOR MONITORING QUALITY OF SERVICES PROVIDED BY CLOUD SERVICE PROVIDERS

FIELD

The field relates generally to information processing systems, and more particularly to information processing systems comprising cloud infrastructure.

BACKGROUND

Information processing systems increasingly utilize reconfigurable virtual resources to meet changing user needs in an efficient, flexible and cost-effective manner. For example, cloud computing environments implemented using various types of virtualization techniques are known. These illustratively include operating system level virtualization techniques such as Linux containers. Such containers may be used to provide at least a portion of the cloud infrastructure of a given information processing system. Other types of virtualization such as virtual machines implemented using a hypervisor can additionally or alternatively be used. However, significant challenges remain in implementation of cloud infrastructure. For example, it is often unduly difficult to provision cloud services in multi-cloud environments.

SUMMARY

Illustrative embodiments of the present invention provide techniques for monitoring quality of service provided by one or more cloud service providers.

In one embodiment, an apparatus comprises at least one processing device comprising a processor coupled to a memory, wherein the processing device is configured to implement a first ledger node of a plurality of ledger nodes configured to collectively maintain a distributed ledger for monitoring quality of service provided by one or more cloud service providers. The first ledger node is configured to obtain a set of quality of service metrics for a given workload running on a given one of the cloud service providers, and to receive, from a client agent running on at least one virtual computing resource instance of the given cloud service provider, a set of monitoring metrics for the given workload operating on the at least one virtual computing resource instance. The first ledger node is also configured to generate a cryptographic block characterizing the set of monitoring metrics, the cryptographic block being entered into the distributed ledger collectively maintained by the plurality of ledger nodes. The first ledger node is further configured to verify whether the given workload meets the set of quality of service metrics based at least in part on the set of monitoring metrics, and to trigger release of one or more resources from a given client device to the given cloud service provider responsive to successful verification that the given workload meets the set of quality of service metrics.

These and other illustrative embodiments include, without limitation, methods, apparatus, networks, systems and processor-readable storage media.

BRIEF DESCRIPTION OF THE DRAWINGS

FIG. 5 shows pseudocode for validating quality of service metrics in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
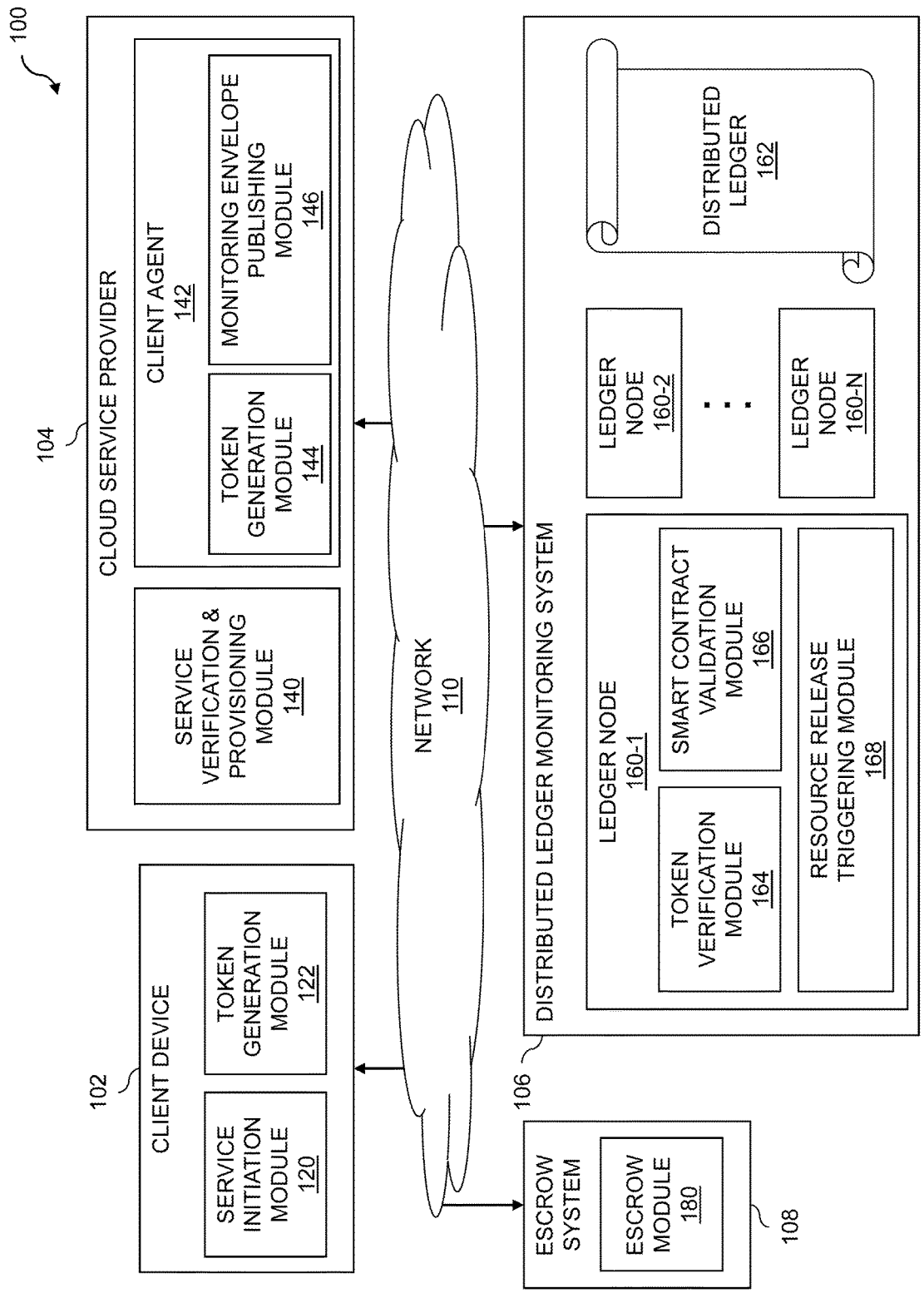
FIG. 1 is a block diagram of an information processing system for monitoring quality of services provided by cloud service providers using a distributed ledger in an illustrative embodiment of the invention.

FIG. 1 shows an information processing system 100, including a client device 102, a cloud service provider 104, a distributed ledger monitoring system 106 and an escrow system 108 coupled via a network 110. The cloud service provider 104 may be an operator of a public cloud, a private cloud, a hybrid cloud that includes both private cloud and public cloud components, a multi-cloud arrangement, etc. The cloud service provider 104 is therefore assumed to comprise one or more clouds, each having respective sets of cloud resources such as compute, storage and network resources in various configurations. Such clouds may include cloud infrastructure, such as a Virtustream Enterprise Cloud, Virtustream Storage Cloud, Google Cloud Platform (GCP), Amazon Web Services (AWS), and Microsoft Azure. The cloud service provider 104 offers cloud services for consumption by various clients or consumers, such as client device 102. The cloud service provider 104 is also referred to herein as a service provider (SP) system 104.

The distributed ledger monitoring system 106 comprises a plurality of ledger nodes 160-1, 160-2, . . . 160-N (collectively, ledger nodes 160) which implement a distributed ledger 162. In some embodiments, the distributed ledger 162 may be a blockchain distributed ledger. The ledger nodes 160 maintain the distributed ledger 162 on a peer-to-peer basis without utilizing a centralized transaction authority.

The distributed ledger 162 in some embodiments is implemented as a blockchain distributed ledger, which may be in the form of a distributed database across a public network that maintains a continuously-growing list of records more generally referred to herein as "blocks." Each block illustratively contains a timestamp and a link to a previous block. The blocks are generated using cryptographic techniques in order to allow each participant on the public network to manipulate the blocks in a secure way without the need for a central authority.

For example, monitoring metrics for cloud services provided by the cloud service provider 104 to the client device 102 may be entered as corresponding respective blocks into the distributed ledger 162, with each block referencing the previous block and being secured from tampering and revision through the use of designated cryptographic techniques. A given block is added to the blockchain distributed ledger only after successful cryptographic verification.

In some embodiments, any system user or other entity can verify the information in a given block by processing a signature in a block header using a public key of a corresponding account. However, only the "owner" of the corresponding account of the given block has the private key that allows full access to the block contents. The addition of new blocks to the blockchain distributed ledger may be advertised to all appropriate system entities.

The blockchain distributed ledger is illustratively configured to provide transparency and immutability of monitoring metrics for cloud services provided by the cloud service provider 104 to the client device 102, in that changes to the distributed ledger 162 are publicly viewable by all participants and the corresponding blocks cannot be altered or deleted. Overhead costs are significantly reduced in these and other illustrative embodiments by eliminating the need for a centralized authority or other similar third party intermediary.

The cloud service provider 104 may operate one or more clouds, with each cloud illustratively comprising a plurality of host devices configured to support execution of applications on behalf of multiple users, although such host devices are not explicitly shown in the figure. For example, the host devices of a cloud operated by the cloud service provider 104 may comprise respective container host devices. Cloud native applications can execute in respective application containers implemented utilizing the container host devices. The container host devices may comprise Docker containers, LXD containers, Cloud Foundry Diego-based containers or other types of containers. These and other host devices are examples of what are more generally referred to herein as "processing devices."

It should be noted that references above and elsewhere herein to container host devices should not be viewed as limiting in any way. Other embodiments can utilize other types of host devices, including virtual machines (VMs) and "bare metal" hosts. The term "host device" as used herein is therefore intended to be broadly construed.

One or more clouds operated by the cloud service provider 104 may be implemented using a layered architecture. For example, such a cloud can comprise a Platform-as-a-Service (PaaS) layer overlying an Infrastructure-as-a-Service (IaaS) layer. The IaaS layer may illustratively comprise a plurality of VM instances configured to support application containers or other containers of the PaaS layer of the cloud.

One or more of the clouds operated by the cloud service provider 104 may also include at least one storage platform implementing one or more of block storage, object storage and file storage, although additional or alternative types of storage platforms can be used in other embodiments. The block storage may be implemented using a software-defined storage product such as ScaleIO™ to provide a virtual storage area network (vSAN). The object storage may be implemented using a cloud storage product such as Elastic Cloud Storage (ECS). The file storage may be implemented using Isilon® platform nodes and associated accelerators in the S-Series, X-Series and NL-Series product lines. The above-mentioned storage products are from Dell EMC.

Different combinations of these and numerous other storage products can also be used in implementing a given storage platform in an illustrative embodiment. Additional examples of storage products that may be used in other embodiments include VNX® and Symmetrix VMAX® storage arrays, all-flash and hybrid flash storage arrays such as Unity™, object-based storage products such as Atmos®, scale-out all-flash storage arrays such as XtremIO™, and software-defined storage products such ViPR®, also from Dell EMC. Combinations of multiple ones of these and other storage products can also be used in implementing a given storage platform in an illustrative embodiment.

The client device 102 includes a service initiation module 120 and a token generation module 122. The service initiation module 120 is configured to enable the client device 102 to request cloud services to be executed on the cloud service provider 104. In conjunction with a request for cloud services, the service initiation module 120 of the client device 102 may agree to and publish a set of quality of service metrics that will be utilized to evaluate delivery of the requested cloud services of the cloud service provider 104. The quality of service metrics are published prior to execution of the cloud services (e.g., through entry into one or more blocks of the distributed ledger 162, or through other suitable publishing means). The service initiation module 120 is further configured to provide, prior to execution of the requested cloud services, one or more resources to be exchanged for the requested cloud services to the escrow system 108. In some embodiments, the resources to be exchanged include a conditional payment for the requested cloud services.

The escrow system 108 implements an escrow module 180, which is configured to implement a smart contract for triggering release of such resources to the cloud service provider 104 responsive to verification that the requested cloud services provided by the cloud service provider 104 meet the quality of service metrics agreed upon between the client device 102 and the cloud service provider 104. Although shown as external to the cloud service provider 104 in FIG. 1, in some embodiments the escrow system 108 may be implemented at least partially internal to the cloud service provider 104, the distributed ledger monitoring system 106, etc.

The cloud service provider 104 implements a service verification and provisioning module 140, along with a client agent 142 implementing a token generation module 144 and a monitoring envelope publishing module 146. The service verification and provisioning module 140 can receive requests to initiate cloud services on the cloud service provider 104 from the service initiation module 120 of client device 102. Prior to provisioning the requested cloud services, the service verification and provisioning module 140 may verify that resources have been provided to the escrow system 108 by the client device 102 for the requested cloud services. The service verification and provisioning module 140 may be further configured to negotiate the quality of service metrics that will be utilized to evaluate the cloud services provided by the cloud service provider 104 to the client device 102 as described above.

The client agent 142 may comprise a software program deployed on one or more clouds operated by the cloud service provider 104 to monitor execution of workloads of the client device 102 (e.g., the requested cloud services). The client agent 142 may comprise software code that is digitally signed by the client device 102. The client agent 142 may be provisioned with a secret key shared by the client device 102, such that the token generation module 122 of client device 102 and the token generation module 144 of client agent 142 may generate tokens used to validate monitoring metrics that are published by the monitoring envelope publishing module 146. The monitoring envelope publishing module 146 may aggregate monitoring metrics (e.g., for some defined period of time) in monitoring data envelopes which are published or otherwise provided to the distributed ledger monitoring system 106.

The distributed ledger monitoring system 106, as noted above, includes ledger nodes 160 which collectively maintain distributed ledger 162. The ledger node 160-1, for example, includes a token verification module 164, a smart contract validation module 166 and a resource release triggering module 168. Although not shown in FIG. 1 for clarity of illustration, other ones of the ledger nodes 160 (e.g., ledger nodes 160-2 through 160-N) are assumed to be similarly configured with token verification modules, smart contract validation modules and resource release triggering modules.

The token verification module 164 is configured to receive tokens generated by the token generation module 122 of client device 102 and the token generation module 144 of client agent 142 operating on cloud service provider 104, and to determine whether such tokens match (e.g., to validate that received monitoring metrics are coming from an authorized or trusted source). On confirming that the received monitoring metrics come from the authorized or trusted source (e.g., by matching the received tokens), the ledger node 160-1 may generate a cryptographic block characterizing the monitoring metrics to be entered into the distributed ledger 162. Any of a wide variety of cryptographic functions can be applied in generating the cryptographic blocks entered into the distributed ledger 162. Examples of such cryptographic functions can be found in A. J. Menezes et al., "Handbook of Applied Cryptography," CRC Press, August 2001, which is incorporated by reference herein.

The smart contract validation module 166 implements a smart contract for determining whether monitoring metrics included in monitoring envelopes provided by the monitoring envelope publishing module 146 of client agent 142 meet the quality of service metrics agreed upon between the client device 102 and the cloud service provider 104 for the requested cloud services. The resource release triggering module 168 triggers release of resources held by the escrow system 108 to the cloud service provider 104 if such conditions are met. If the conditions are not met, or if a designated time period has expired, the resource release triggering module 168 may return the resources to the client device 102.

In some embodiments, the monitoring metrics provided by the monitoring envelope publishing module 146 include information regarding the cloud resources utilized to provide the requested cloud services to the client device 102. Such information regarding cloud resources may include resource metrics such as virtual central processing unit (CPU) or vCPU in number of gigahertz (GHz), random access memory (RAM) in gigabytes (GB), storage in number of GB, network bandwidth in number of megabits per second (Mbit/s), disk input/output operations per second (IOPS), etc. The information regarding the cloud resources may also or alternatively include utilization metrics, saturation metrics, error metrics, and availability metrics as will be described in further detail below.

The client device 102, cloud service provider 104, distributed ledger monitoring system 106 and escrow system 108 of the information processing system 100 in the FIG. 1 embodiment are assumed to be implemented using at least one processing platform each comprising one or more processing devices each having a processor coupled to a memory. Such processing devices can illustratively include particular arrangements of compute, storage and network resources.

At least portions of the service initiation module 120, the token generation module 122, service verification and provisioning module 140, client agent 142, token generation module 144, monitoring envelope publishing module 146, token verification module 164, smart contract validation module 166, resource release triggering module 168 and escrow module 180 may be implemented at least in part in the form of software that is stored in memory and executed by a processor.

The client device 102, cloud service provider 104, distributed ledger monitoring system 106 and escrow system 108, or components thereof (e.g., ledger nodes 160) may be implemented on respective distinct processing platforms, although numerous other arrangements are possible. For example, in some embodiments at least portions of the escrow system 108 and cloud service provider 104 may be implemented on the same processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the client device 102, cloud service provider 104, distributed ledger monitoring system 106, escrow system 108 or portions or components thereof, to reside in different data centers. Numerous other distributed implementations are possible. The ledger nodes 160 of the distributed ledger monitoring system 106 and other components of the system 100, for example, can be implemented in a distributed manner across multiple data centers.

Additional examples of processing platforms utilized to implement components of the system 100 will be described in more detail below in conjunction with FIGS. 7 and 8.

Figure 2:
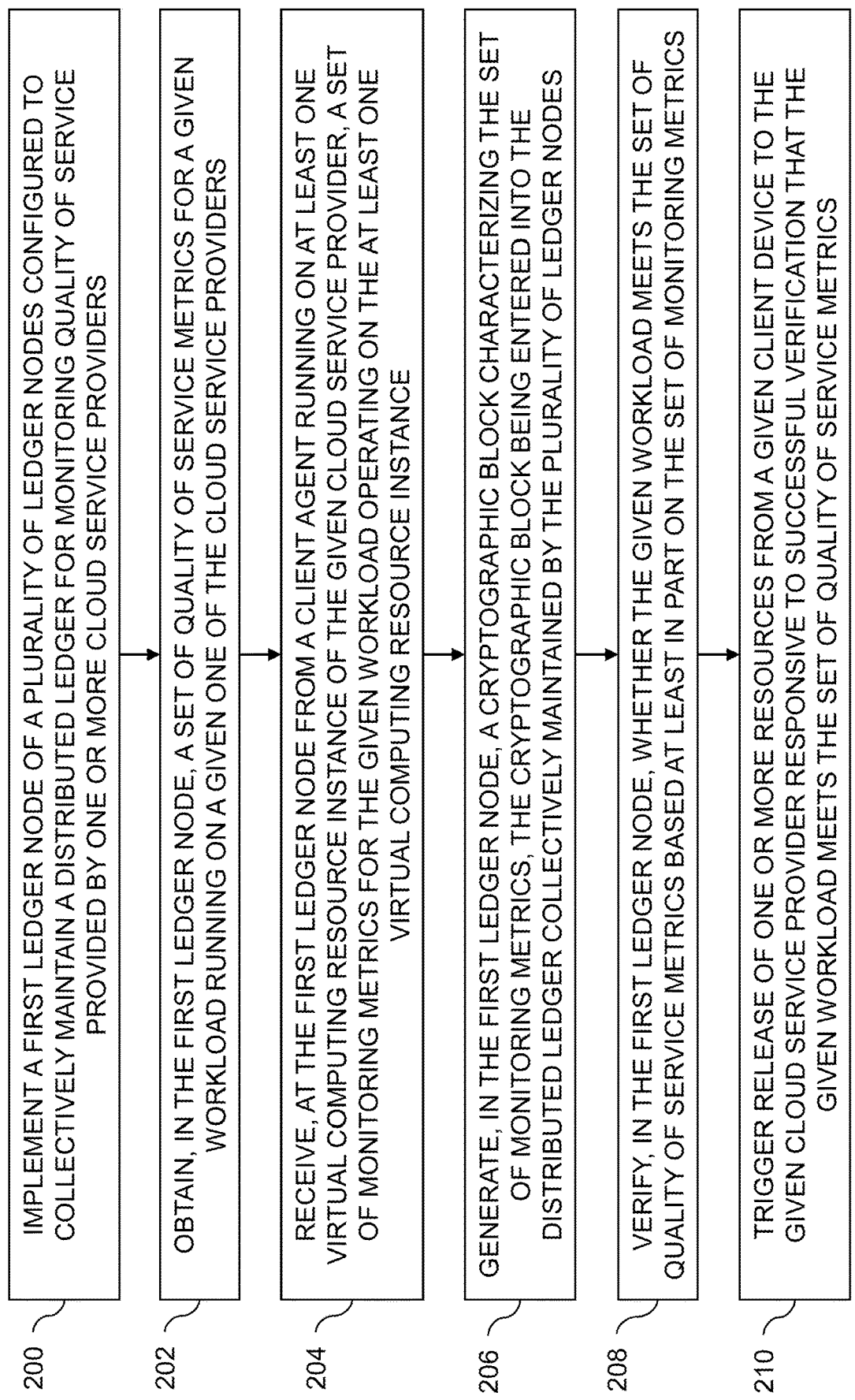
FIG. 2 is a flow diagram of an exemplary process for monitoring quality of services provided by cloud service providers using a distributed ledger in processing nodes in an illustrative embodiment.

An exemplary process for monitoring quality of service provided by cloud service providers utilizing a distributed ledger will now be described in more detail with reference to the flow diagram of FIG. 2. It is to be understood that this particular process is only an example, and that additional or alternative processes for monitoring quality of service provided by cloud service providers utilizing a distributed ledger can be carried out in other embodiments.

In this embodiment, the process includes steps 200 through 210. These steps are assumed to be performed by the ledger nodes 160 of distributed ledger monitoring system 106 utilizing the token verification module 164, smart contract validation module 166 and resource release triggering module 168. The process begins with step 200, implementing a first ledger node (e.g., 160-1) of a plurality of ledger nodes (e.g., 160) that are configured to collectively maintain a distributed ledger (e.g., 162) for monitoring quality of service provided by one or more cloud service providers. The distributed ledger may comprise a blockchain distributed ledger maintained on a peer-to-peer basis without utilizing a centralized transaction authority.

In step 202, the first ledger node obtains a set of quality of service metrics for a given workload running on a given one of the cloud service providers (e.g., cloud service provider 104). The first ledger node in step 204 receives, from a client agent (e.g., 142) running on at least one virtual computing resource instance of the given cloud service provider, a set of monitoring metrics for the given workload operating on the at least one virtual computing resource instance. The given workload may comprise an IaaS cloud service provided by the given cloud service provider. The IaaS cloud service may comprise at least one virtual computing resource instance, where the at least one virtual computing resource instance comprises one or more VM instances, one or more application container instances, combinations thereof, etc.

The monitoring metrics received in step 204 may include, but are not limited to: resource metrics describing a state of a given set of resources utilized to implement the at least one virtual computing resource instance, the given set of resources comprising one or more compute, storage and networking resources of the given cloud service provider; utilization metrics describing at least one of a percentage of time that the given set of resources are in use and a percentage of a capacity of the given set of resources that are in use; saturation metrics describing an amount of requested work that the given set of resources has not yet serviced; error metrics describing internal errors of the given set of resources; availability metrics describing a percentage of time that the given set of resources responded to one or more requests; etc.

The set of monitoring metrics received in step 204 may be received in the form of a monitoring data envelope that aggregates monitoring data for the at least one virtual computing resource instance for a designated period of time. The monitoring data envelope may comprise an identifier of at least one of the given service provider and the at least one virtual computing resource instance, an identifier of at least one of the given client device and a user of the given client device, the set of monitoring metrics, and a one-time passcode (OTP) token generated by the client agent based on a secret key shared with the given client device, the secret key not being known to the given cloud service provider.

Step 204, in some embodiments, includes the first ledger node receiving a first OTP token for the given workload from the given client device and a second OTP token for the given workload from the client agent. The client agent, in some embodiments, utilizes software code digitally signed by the given client device. The first ledger node may verify that the first and second OTP tokens match prior to continuing with steps 206 through 210 of the FIG. 2 process. The first and second OTP tokens, in some embodiments, comprise respective hash-based message authentication codes (HMACs) generated utilizing an HMAC-based one-time passcode algorithm (HOTP) utilizing the secret key that is provisioned in the client agent but not known to the given cloud service provider.

In step 206, a cryptographic block is generated characterizing the set of monitoring metrics. The cryptographic block is entered into the distributed ledger collectively maintained by the plurality of ledger nodes. The distributed ledger may thus provide an audit trail permitting clients and SPs to track quality of service of cloud services over time.

In step 208, the first ledger node verifies whether the given workload meets the set of quality of service metrics obtained in step 202 based at least in part on the set of monitoring metrics received in step 204. The quality of service metrics may include a set of service level agreement (SLA) conditions that are agreed upon between the given client device and the given cloud service provider prior to execution of the given workload. The first ledger node triggers release of one or more resources from the given client device to the given cloud service provider in step 210, responsive to successful verification that the given workload meets the set of quality of service metrics. Step 210 may include triggering the release of a conditional payment that is provided to an escrow smart contract prior to execution of the given workload on the given cloud service provider. In some embodiments, the conditional payment comprises a hash-locked transaction of a given cryptocurrency. Step 210 may also include triggering return of the one or more resources to the given client device responsive to at least one of: expiration of a designated time period; and unsuccessful verification that the given workload meets the set of quality of service metrics.

Despite the advantages of modern IaaS approaches to hosting infrastructure, accurate verification and billing of services is still a major challenge for SPs and clients or customers. It is common for clients to have difficulty understanding service reports or statements (e.g., bills), and for there to be a lack of transparency in statements about system resilience. IaaS billing solutions, for example, may involve consumption-based pricing models coupled with utility invoicing, whereby bills are produced subsequent to service provisioning. For example, invoices are often produced at the end of a monthly billing period. Improvements to billing accuracy frequently focus on improving data collection (e.g., by improving the accuracy of the data which bills are based upon) or increasing automation (e.g., removing manual steps in the billing process). Techniques are thus needed for improved accuracy and resolution of contracts for IaaS services. In some embodiments, payment for IaaS services is considered as a fair exchange problem. Some embodiments utilize techniques whereby a client advances conditional payments that are automatically released to a SP when SLA conditions specified for IaaS services are met. To do so, some embodiments utilize a cryptographic trusted third party to procedurally guarantee fair exchange of payment for services.

Various embodiments are described below in the context of real-time fair exchange of payments for IaaS services. It should be appreciated, however, that the techniques described herein are applicable to various other exchanges between two parties. For example, while described below primarily in the context of IaaS services, other types of cloud services such as Software as a Service (SaaS), PaaS, Anything as a Service (XaaS), etc. may be part of the exchange between a client and the SP. Further, the exchange between the client and the SP need not be limited to monetary payment, but may also include exchange of goods and services or more generally transfer of one or more resources between a client and the SP.

Some embodiments utilize a solution involving an advance conditional payment for services at the point of usage, rather than subsequent to usage. The advance conditional payment is automatically released to the SP when SLA conductions are met. Such approaches are well-suited for consumption-based pricing models where the SP charges clients based on resource usage instead of paying for a pre-arranged period of time. Advantageously, embodiments are able to directly associate payments with usage, at the time of usage. Conventional arrangements, such as utility billing solutions, instead focus on monthly (or quarterly) invoicing, or other methods of collecting payment either far in advance of or subsequent to usage. Some embodiments are thus able to overcome problems associated with credit risk, cash flow, accuracy (e.g., discrepancies between billing and actual usage), etc.

Credit risk, in this context, refers to the risk of loss by the SP resulting from a client's failure to meet contractual obligations. In particular, an IaaS provider assumes a credit risk when delivering IaaS services in advance of payment. In effect, the IaaS provider has provided the IaaS services on credit, with the assumption that the client will in fact deliver payment as agreed at the end of the term. Providing a service on credit necessitates checking thoroughly beforehand that a prospective client will be able to meet their obligations, which imposes an administrative burden on the SP.

For SPs, effective cash flow management increases the funds available for strategic investment by speeding up receipt of payments, while also slowing down outgoing expenses. Speeding up payment for services can result in significant improvements to maintaining a positive cash flow. Conversely, SPs suffer when they receive late payments, resulting in poor cash flow and impacting their ability to pay debt on time or invest for expansion.

Various SPs, such as IaaS providers, may struggle to generate accurate invoices for clients. There are several challenges involved in producing an accurate bill or invoice for IaaS services, including the collection of accurate consumption data, invoicing for different combinations of services, understanding which services were consumed by a given client in a multi-tenant environment, etc.

Advantages provided by the use of conditional real-time payments include but are not limited to: real-time payments increase working capital for the SP (e.g., there is no requirement to wait until the end of the billing period to access funds); real-time payment reduces the risk of late payments to the SP; increased transparency through auditable records stored on a distributed ledger visible to all involved parties; clear itemization of billing items; avoids the need to resolve billing discrepancies at cancellation time (e.g., by removing the requirement for pro-rata calculations for partial service during a billing period); payments can be made conditional on external verification; advance conditional payments require less administrative due diligence to be conducted on prospective clients; defining SLA agreements in code demonstrates the SP's commitment to transparency and fair pricing with associated reputational benefits for the SP; etc.

In addition, some embodiments enable the recording of accurate historical consumption data on an audited distributed ledger. This provides further benefits beyond those applicable to payments, including but not limited to: being able to analyze trends in the stored data aids capacity planning for the SP; access to a real-time stream of detailed low-level monitoring data can have benefits to clients by allowing the clients to monitor costs; etc.

The issue of accurate billing for IaaS services, in some embodiments, is viewed as a fair exchange problem. The concept of fair exchange may be simplified as follows: suppose that two parties, Alice and Bob, wish to trade items. Further suppose that Alice sends her item to Bob, but Bob then refuses to send his item to Alice. In that case, it is not a fair exchange because Bob received Alice's item but Alice received nothing in return. A fair exchange solution seeks to address unfairness by ensuring that both parties in a transaction receive their counterparty's item, or that both receive nothing.

When discussing payments outside of the digital domain, the notions of fair exchange and trust may be taken for granted. Commercial exchanges in the real world (e.g., the non-digital domain) are expected to be fair, and in most cases are. It is easier to place trust in a trading partner when that partner can be identified and their reputation easily verified. Fair exchange, however, is a more difficult problem for transactions in the digital domain due to the inherent lack of trust.

Drawing a parallel with the problem at hand, consider the following scenario: Alice requests a period of VM usage for a particular price for a particular time period and Bob delivers the service, but there is some interruption to service during the time period. Alice makes payment at the end of the time period for the full service, thus leading to an unfair result for Alice. There are many unfair variations to this scenario. For example, Alice may become aware of the service interruption subsequent to payment and demand a refund, placing an administrative burden on Bob (e.g., the SP) to quantify the quality of service available during the period to determine an accurate and appropriate refund. Alice may alternatively become aware of the service interruption and refuse payment, resulting in an unfair exchange for Bob as Bob has provided partial service but received no payment at all. In the absence of independently verified quality of service data, either party may misstate facts about service quality to the other, resulting in administrative burden, unfair payments, or both.

Some solutions to the fair exchange problem rely on the intervention of a Trusted Third Party (TTP) that is assumed to be honest and help the parties (e.g., Alice and Bob, or more generally a client and SP) transact fairly. A TTP is a process directly accessible to both parties. Fairness is thus trivially ensured by having the parties send their items to the TTP, which then forwards the items if the terms of the exchange are fulfilled.

While a TTP organization of some kind has traditionally been a requirement, some embodiments utilize trustless distributed ledgers (e.g., blockchains) and smart contracts to provide the role of a mediating third party that facilities the fair exchange of payment and execution result.

In the case of payment for IaaS services, there is a fair exchange problem that involves an "indescribable item" that cannot be formally specified. The problem of item validation becomes more complex when indescribable items are the subject of the exchange. Fair exchange is a fundamental mechanism for electronic commerce that assumes it is possible to verify the correctness of the digital items to be exchanged. However, when an item is indescribable (e.g., it cannot be formally specified), its verification becomes difficult if not impossible thus hindering a practical deployment of fair exchange.

IaaS customers or clients access resources and request IaaS services through a wide area network (WAN), and can use mechanisms supplied by the SP to install the remaining elements of an application stack. IaaS is the delivery of hardware (e.g., servers, storage, network, etc.) and associated software (e.g., operating systems, virtualization technology, file systems, etc.) as a service. IaaS is an evolution of traditional hosting that does not require any long term commitment, and allows clients to provision resources on demand. For example, a client can log in to an IaaS platform to create VMs, manage application containers, install operating systems, deploy applications, manage storage, and perform various other activities associated with a flexible managed infrastructure. Clients can use the IaaS provider's services to track costs, monitor performance, and troubleshoot application issues. Cloud computing models require the participation of the SP, with the SP often being a third-party organization that specializes in selling IaaS. Virtustream Enterprise Cloud, AWS and GCP are examples of independent IaaS providers.

A blockchain is essentially a distributed ledger that comprises a continuously growing set of records. The distributed nature of blockchains implies that no single entity controls the ledger, but rather that the participants collaborate to verify the data. The data is organized in blocks that are linked together cryptographically (e.g., using cryptographic hashes). In some cases, the blocks in a distributed ledger are composed of: information about transactions; information about the entities participating in the transactions; and a unique hash which distinguishes each block from every other block.

A distributed ledger such as a blockchain is a form of a distributed database, in the sense that each node has a copy of the data. Distributed ledgers differ from traditional distributed database architectures in a number of respects. For example, distributed ledgers exhibit decentralization in that control of the distributed ledger or database is decentralized in the sense that it is coordinated by multiple network participants. There is no need for a central administrator to ensure the integrity of the data or its consistency across nodes. Instead, this is achieved through some consensus mechanism or validation protocol. Distributed ledgers also differ from traditional distributed database architectures in that distributed ledgers are reliable in trustless environments. The consensus mechanism ensures the consistency and integrity of the distributed ledger even if the parties involved do not fully trust each other. Distributed ledgers further differ from traditional database architectures in that cryptographic encryption tools are utilized to deliver decentralization and reliability. Examples of distributed ledgers include the VMware® Blockchain, Secure Ledger, etc.

Bitcoin is a decentralized digital currency, proposed in 2008, that may be used in some embodiments to support conditional payments. Bitcoins are typically associated with addresses, where an address is a hash of a public key. In a typical Bitcoin transaction, a party creates a transaction which lists one or more input addresses as a source of funds and one or more output addresses to send the funds to. The transaction must be signed with the private keys corresponding to the input addresses. Signed transactions are then broadcast to the Bitcoin network, where they are validated and grouped into blocks by miners.

In addition to the typical transaction above, Bitcoin can also support a limited number of operation codes or op_codes, which are functions that can be used to create scripts. For example, using the OP_SHA256 operation, a hash-locked transaction can be created. This type of transaction can be used to specify a value y and require that in order to spend the output of the transaction, one must provide some x such that SHA256(x)=y.

The op_codes OP_CHECKLOCKTIMEVERIFY and OP_CHECKSEQUENCEVERIFY are recent additions to the Bitcoin language which can provide additional functionality useful for conditional payments. These operations allow a transaction to specify execution paths in the spending scripts that can only be validated after some period of time. Using these primitives, a transaction can be constructed which will send payment to Alice's address and specify that, if after 24 hours Alice has not redeemed the output, then Bob can claim it by signing with his private key.

Although Bitcoin provides a limited number of functional primitives, these are sufficient to enable conditional payments. The Ethereum cryptocurrency also provides a scripting language, allowing more expressive arbitrary programs as conditions for spending payment. These programs are commonly referred to as "smart contracts."

As transactions can specify arbitrary scripts, there is no guarantee that they will ever halt. Each Ethereum transaction, for example, therefore contains "gas" or payment that is sent to the miner to run the transaction. Every computational step has a fixed gas cost, and the miner will only run the computation until it runs out of gas. Therefore, although in theory Ethereum scripts can support arbitrary programs, in practice the gas restriction limits complex computations.

Although just two cryptocurrency systems are described above, it should be appreciated that various other cryptocurrency systems may be utilized to support conditional payments.

In cryptography, a zero-knowledge proof or zero-knowledge protocol is a method by which one party (e.g., the prover) can prove to another party (e.g., the verifier) that they know a value x, without conveying any information other than the fact that they know the value x. A zero-knowledge proof system has two main properties that need to be preserved: soundness and zero-knowledge. The soundness property states that the prover cannot generate false proofs that convince the verifier of something untrue. The zero-knowledge property states that the proof leaks no information about the inputs other than the statement that is being proven.

The design of IaaS architectures often allows users to store and access files without requiring knowledge of what machines or in what geographic locations their files reside. In these scenarios, clients may want to periodically request that the SP supply proof that they do still, in fact, hold the files stored by the client, which could be time consuming and resource intensive. To this end, proof of retrievability (POR) algorithms are applied to the concept of zero-knowledge proofs in order to allow the SP to verify to a client that a file is intact. A POR is a compact proof by a file system (e.g., a prover) to a client (e.g., a verifier) that a target file F is intact, in the sense that the client can fully recover it. As PORs incur lower communication complexity than transmission of F itself, they are an attractive building block for high-assurance remote storage systems.

POR and zero-knowledge proofs may be further combined to apply to payments for certain kinds of digital services. For example, a zero knowledge contingent service payment (ZKCP) algorithm can extend zero-knowledge proofs. Consider Alice, a user of a subscription online file storage service. The online file storage service is assumed to offer a service that, for a fee, will provide a succinct POR to clients demonstrating that all of that client's files are being stored. A client may wish to pay for this service, presenting a fair exchange problem in that the client wants to pay once the POR is received whereas the online file storage service will only send the POR once it has been paid.

POR algorithms and ZKCP algorithms may be used to provide "proof of service," or the desire to validate that a service was available during a given time period. However, POR algorithms are themselves not directly applicable for validating SLAs for IaaS workloads. While storage may in some cases form part of the IaaS service being delivered, other aspects of the IaaS service such as CPU cycles or network bandwidth are not describable in the same way.

Additionally, there is no particular requirement for a proof of service algorithm to hide information about the inputs (e.g., it is acceptable, and in some cases preferable, that accurate quality of service information be available to all parties).

Some embodiments use service quality conditional payments as a mechanism for fair exchange of payment for IaaS services. One key challenge for fair exchange in the case of service payments is the problem of verifying the quality of service. Verifying the quality of service, in some embodiments, includes proving that specified SLAs have been attained during a given period. Fair exchange in the context of IaaS, for example, is dependent on proof of service. Further, the proof of service cannot be supplied by the SP or the client, or even an independent TTP organization. Some embodiments utilize techniques whereby proof of service is automated and cryptographically verifiable.

Figure 3:
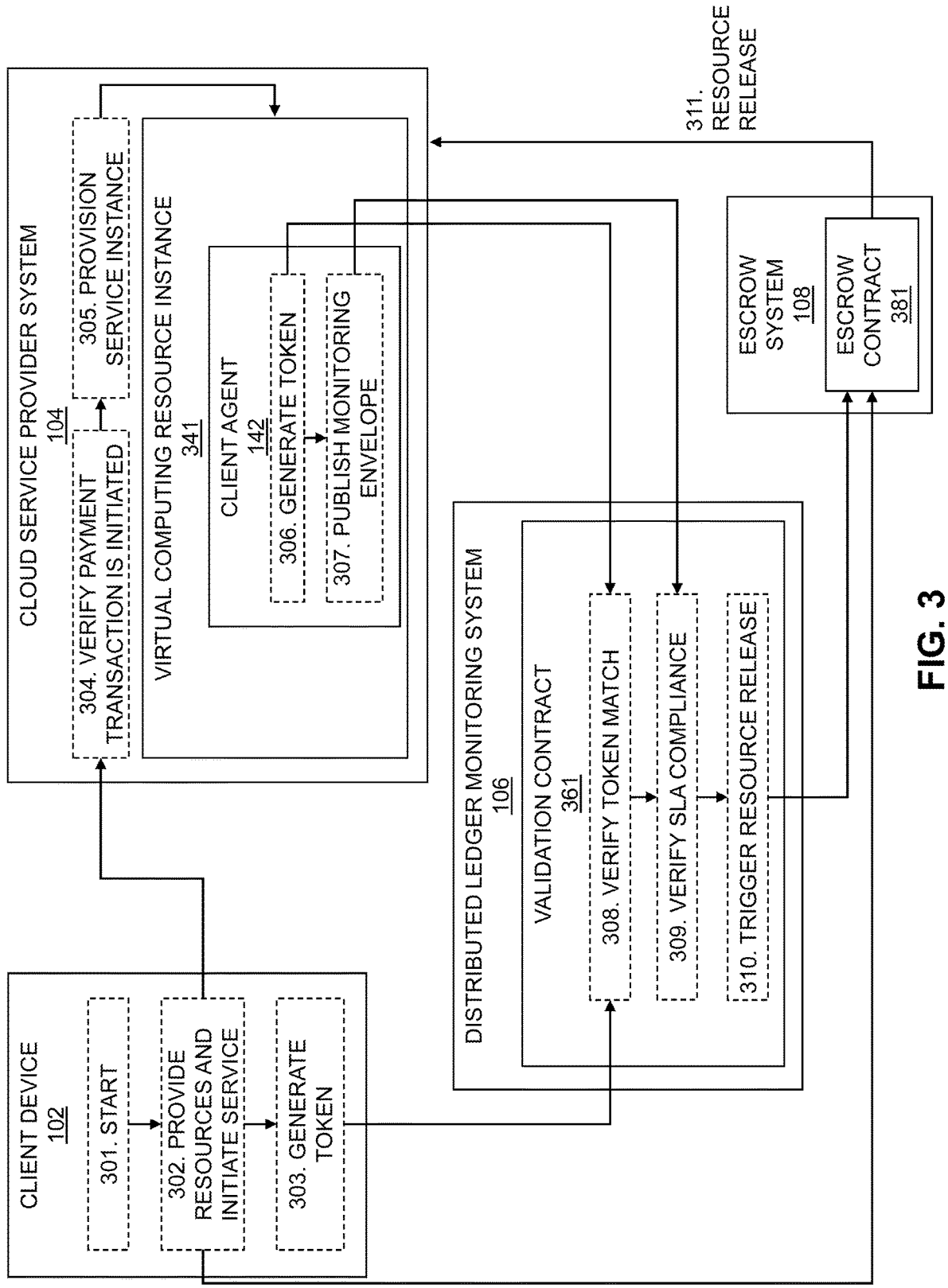
FIG. 3 is a system flow of a process for monitoring quality of services provided by cloud service providers using a distributed ledger in an illustrative embodiment.

FIG. 3 illustrates a system flow for utilizing service quality conditional payments for the exchange of payment for IaaS or other types of cloud or digital services. FIG. 3 shows client device 102, which is assumed to be operated by the customer or purchaser of an IaaS, cloud or other type of digital service from a cloud service provider system 104, also referred to as SP system 104. The SP system 104 is assumed to be a managed provider of the digital services (e.g., IaaS services such as VM instances, application container instances, etc.) to the client device 102.

The client device 102 and SP system 104 utilize SLAs to specify and define a level of service expected from the SP system 104 in providing a workload of digital services to the client device 102. The workload, in some embodiments, is assumed to comprise at least one of the following types of IaaS services: one or more VM instances, where each VM instance is assumed to comprise a computing VM that includes a combination of CPU, network bandwidth and storage resources; and one or more application container instances, where the application container instances are assumed to comprise lightweight application virtualization environments (e.g., Docker containers or other types of Linux containers) used to bundle software packages. These types of workloads are represented in FIG. 2 by virtual computing resource instance 341, which implements the client agent 142 that provides monitoring metrics to the distributed ledger monitoring system 106 as will be described in further detail below.

The distributed ledger monitoring system 106 utilizes distributed ledger 162 (e.g., a mechanism for sharing data across a network of participants such as ledger nodes 160) to store and aggregate monitoring data for the digital services provided by the SP system 104 to the client device 102. The distributed ledger monitoring system 106, in some embodiments, utilizes a private, permissioned distributed ledger which is accessible only to network participants. The distributed ledger monitoring system 106 may store and share aggregated monitoring data, which may optionally be combined with a publicly available payment ledger for transferring payment for digital services provided by the SP system 104 to the client device 102. Cryptographic proofs are utilized to ensure that the data recorded on the distributed ledger is immutable, and to guarantee that no data has been lost.

In the FIG. 3 embodiment, two "smart contracts" are used to enable service quality conditional payments. The term smart contract, in this context, refers to a program or algorithm executed by nodes on a distributed ledger network. The FIG. 3 embodiment utilizes two smart contract algorithms, the SLA contract 361 implemented by the distributed ledger monitoring system 106 and the escrow contract 381 implemented by the escrow system 108. The SLA contract 361 is used to interpret monitoring metrics (e.g., provided by the client agent 142 running on the virtual computing instance 341) to determine if SLA conditions for the digital services provided by the SP system 104 to the client device 102 have been met. The client agent 142 is an example of a "monitoring agent," or a program that collects detailed monitoring metrics from a host (e.g., virtual computing resource instance 341), which are then used by the SLA contract 361 to validate whether the SLA conditions have been met. The escrow contract 381 provides an escrow service responsible for releasing funds or payment to the SP system 104 responsive to validation by the SLA contract 361.

The SLA contract 361 and escrow contract 381 together provide a solution for associating a conditional payment for IaaS or other cloud or digital services with a subsequent validating event which releases the conditional payment. The validating event, in some embodiments, is the receipt and verification by the SLA contract 361 of monitoring data from the client agent 142.

Figure 4:
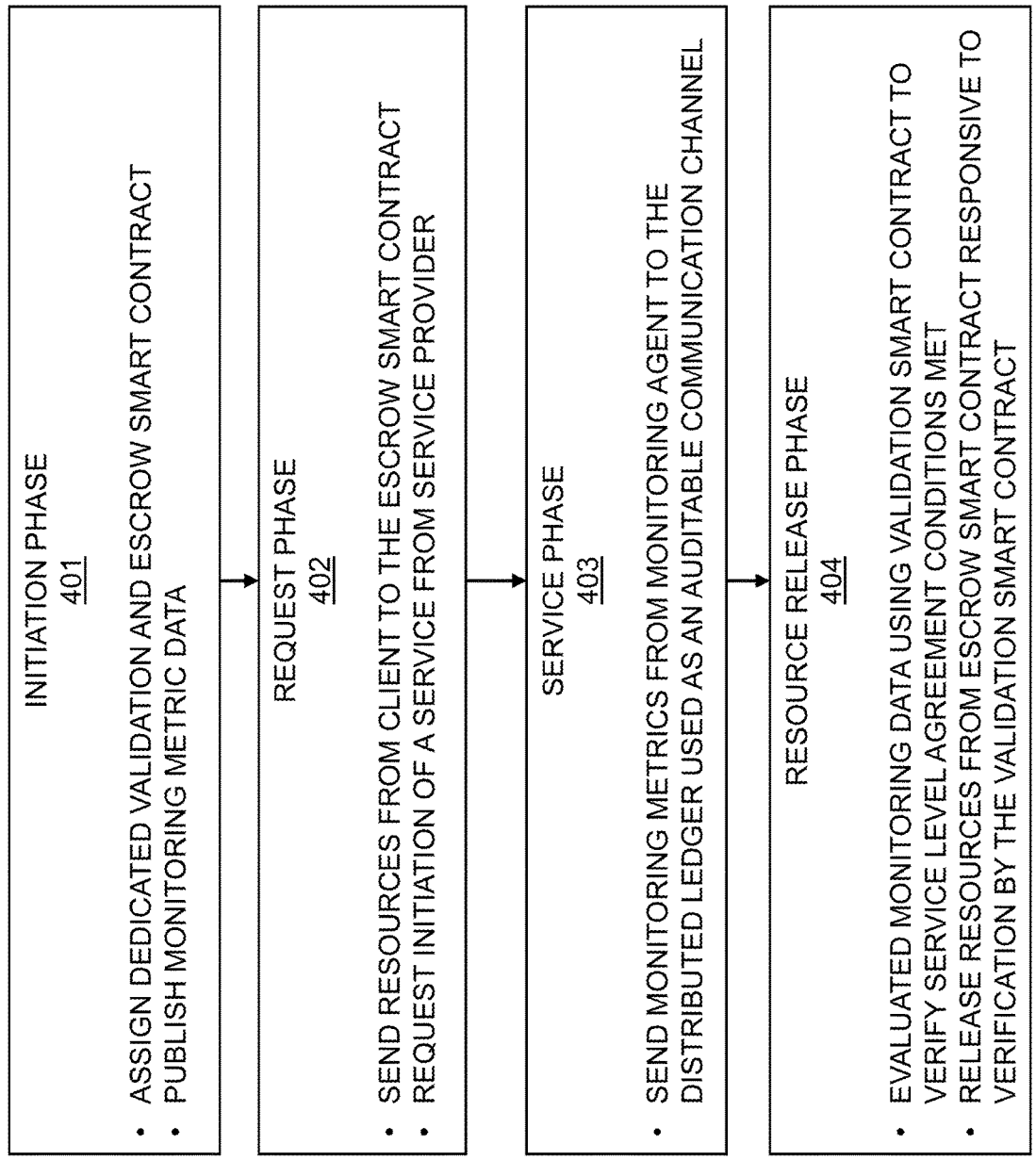
FIG. 4 is a block diagram illustrating phases of a process for monitoring quality of services provided by cloud service providers using a distributed ledger in an illustrative embodiment.

The service quality conditional payment solution illustrated in FIG. 3 may be viewed as containing the four phases illustrated in FIG. 4: an initiation phase 401; a request phase 402; a service phase 403; and a resource release phase 404. In the initiation phase 401, validation and escrow smart contracts (e.g., SLA contract 361 and escrow contract 381) are assigned. Further, monitoring metric data that will be utilized to evaluate the provisioning of digital services by the SP system 104 to the client device 102 is published. The initiation phase 401 is represented in the FIG. 3 system flow by the "start" step 301. Although FIG. 3 shows the start step 301 being performed internal to the client device 102, it should be appreciated that the initiation phase 401 may be performed by one or both of the client device 102 and SP system 104. For example, the terms of the validation and escrow smart contracts may be set by the client device 102 or SP system 104 individually, or may be negotiated between the two. In other cases, the terms of the validation and escrow smart contracts may be set by a third party external to the client device 102 and SP system 104, with the start step 301 representing the client device 102 acquiescing to such terms.

In the request phase 402, the client device 102 sends a payment to the escrow contract 381 and initiates a digital service (e.g., an IaaS service) in the SP system 104. The request phase 402 is represented in the FIG. 3 system flow by steps 302, 304 and 305. In step 302, the client device 102 sends resources (e.g., a conditional payment) to the escrow system 108 and also requests initiation of the digital service by the SP system 104. In step 304, the SP system 104 verifies that the conditional payment transaction has been initiated with the escrow system 108. Responsive to this verification, the SP system 104 in step 305 provisions a digital service instance, where the digital service instance is assumed to comprise the virtual computing resource instance 341. As part of initiating the virtual computing resource instance 341, the client agent 142 (e.g., a monitoring agent) is deployed on the virtual computing resource instance 341.

In the service phase 403, the monitoring agent (e.g., client agent 142) sends monitoring metrics to the distributed ledger monitoring system 106, which is utilized as an auditable communication channel. The service phase 403 is represented in the FIG. 3 system flow by steps 303, 306 and 307. Steps 303 and 306 include the client device 102 and SP system 104 generating respective tokens as will be described in further detail below. Step 307 includes the client agent 142 deployed on the virtual computing instance 341 publishing a monitoring envelope which contains the monitoring metrics for the digital service being provided by the SP system 104 for client device 102. The monitoring envelope will be described in further detail below with respect to FIG. 6.

In the resource release phase 404, the monitoring data is evaluated by the validation smart contract (e.g., the SLA contract 361) on the distributed ledger monitoring system 106 to verify the SLA conditions specified in the initiation phase 401 have been met. Responsive to this verification, the SLA contract 361 triggers payment release by the escrow contract 381. The resource release phase 404 is represented in the FIG. 3 system flow by steps 308 through 311. In step 308, the SLA contract 361 verifies that the tokens generated by the client device 102 and SP system 104 in steps 303 and 306, respectively, match. If the tokens match, the SLA contract 361 in step 309 verifies SLA compliance utilizing the monitoring metric data included in the monitoring envelope published in step 307 by the client agent 142. Responsive to verifying SLA compliance, the SLA contract 361 in step 310 triggers resource release (e.g., of the conditional payment) by the escrow contract 381. The escrow contract 381 in step 311 then releases the resources (e.g., the conditional payment) to the SP system 104.

In some embodiments, two distributed ledgers are combined: a first distributed ledger for recording monitoring and other system data (e.g., on the distributed ledger monitoring system 106) and a public distributed ledger for payments (e.g., a public cryptocurrency network). It should be noted, however, that the use of a public cryptocurrency network is not required. In some embodiments, a trusted relationship may be employed. For example, a typical enterprise relationship may provide a mechanism for requesting customer prepayment and holding funds in a customer account prior to release.

In an untrusted domain, however, the use of a public cryptocurrency network may provide various advantages. For example, in a hosting architecture that allows computing resources to be leased to unknown and untrusted customers with minimal due diligence, a cryptocurrency payment network may be utilized to ensure fair payment. In such embodiments, the cryptocurrency payment network may be used as a means for transferring payment between the client device 102 and SP system 104. Some form of scripting mechanism, such as Bitcoin's hash-locked transactions discussed above, may be used to make the payments conditional.

Similarly, embodiments do not require a custom implementation of a private distributed ledger to record monitoring and other system data. In some embodiments, the private distributed ledger may be a private installation of an otherwise publicly available implementation of a distributed ledger. For example, the private distributed ledger may be a private installation of a VMware® Project Concord distributed ledger, Microsoft® Azure Blockchain, IBM® Hyperledger Fabric, etc.

Additional details regarding the initiation phase 401, request phase 402, service phase 403 and resource release phase 404 will now be described in further detail.

In some embodiments, it is desired to irrevocably attribute monitoring metrics to a specific customer (e.g., client device 102). This is achieved through the use of an HMAC. An HMAC is a specific type of message authentication code (MAC) involving a cryptographic hash function and a secret cryptographic key. When the client device 102 is initially established in the initiation phase 401, the client device 102 is assigned a unique validation agent (e.g., client agent 142) that will execute on the client device 102's virtual computing resource instance 341 (e.g., which may be one or more VM instances, one or more container instances, a combination of one or more VM and one or more container instances, etc.). The client agent 142 acts as the client device 102's dedicated tamper-proof software monitoring agent.

The client agent 142 includes, in some embodiments, an HOTP algorithm. The secret key used to establish the HOTP algorithm is supplied by the client device 102, and is unknown to the SP system 104. A new HOTP-generated token (e.g., step 306) is included with each monitoring data envelope that is sent to the SLA contract 361. The client device 102 is responsible for generating the symmetric equivalent of the HOTP token in its own environment (e.g., step 303), which is also sent to the SLA contract 361. The SLA contract 361 in step 308 verifies that the two HOTP tokens match before triggering payment release in step 310.

The HOTP algorithm provides a method for verification that employs symmetric generation of values, each of which is used for only one verification attempt. The one-time property leads directly from the single use of each counter value. It should be appreciated, however, that other types of OTPs may be used to generate tokens, and that embodiments are not limited to use with MAC or HMAC-based OTP tokens. In some embodiments the tokens generated in step 303 may be produced using a software authentication token application, such as a software implementation of the RSA® SecurID token. Further, while the use of OTP tokens provides various advantages, it should be appreciated that the embodiments are not limited solely to use with OTP tokens.

In order for the client device 102 to validate that the deployed client agent 142 accurately and reliably reports monitoring data, various approaches may be used. One approach is to distribute the source code of the client agent 142 to the client device 102, allowing the client device 102 to audit it. This could then be combined with software code signing to confirm the author and guarantee that the compiled code has not been altered or corrupted.

In the request phase 402, the client device 102 provides advance (conditional) payment and requests a service from the SP system 104. The service may be requested, in some embodiments, via a customer or client portal provided by the SP system 104 that allows the client device 102 to request service and simultaneously make a conditional payment. The payment provided by the client device 102 is conditional; it is initially in a locked state controlled by the escrow smart contract 381, and will only be released by the escrow smart contract 381 to the SP system 104 when the validating contract (e.g., SLA contract 361) verifies that SLA conditions have been satisfied. If the agreed-upon SLA conditions are not satisfied within a defined timeframe, the escrow smart contract 381 will return the payment to the client device 102.

As noted above, some embodiments utilize both an escrow smart contract (e.g., escrow contract 381) and a validation smart contract (e.g., SLA contract 361). The escrow smart contract provides functionality for: (i) accepting conditional payments; (ii) releasing conditional payments to the SP if conditions are triggered (e.g., SLA conditions are met); (iii) returning conditional payments to the client if conditions are triggered (e.g., SLA conditions are not met); and (iv) returning conditional payments to clients if associated timeouts are exceeded.

The validation contract is a programmatic definition of the SLA contract agreed upon between the client and the SP. The validation contract provides functionality for: (i) interpreting the SLA data in the blocks on the distributed ledger to determine if the SLA conditions have been met; (ii) triggering payment release to the SP by contacting the escrow smart contract; and (iii) triggering a payment return to the client if appropriate by contacting the escrow smart contract. The validation contract, in some embodiments, further provides functionality for validating token matches. FIG. 5 shows pseudocode 500 of an algorithm for validating monitoring metrics against SLA conditions.

The service phase 403 includes the flow of events from the point at which the SP system 104 initiates a workload of services for the client device 102. While the workload is running, the client agent 142 sends monitoring metrics to the distributed ledger monitoring system 106 (e.g., step 307). Each metric data item, in some embodiments, is wrapped in an "envelope" that includes the token generated in step 306 (e.g., an HMAC-based token as described above). These steps ensure that the SLA monitoring data used for releasing payment is produced and verified by the client device 102, and that it cannot be tampered with in transit.

The exact contents of the monitoring data or monitoring metrics used to release payment may vary based on the SLAs agreed upon between the client device 102 and the SP system 104. Such SLA conditions, however, are programmatically defined in the validation contract (e.g., SLA contract 361) associated with the client device 102. In this way, the SLA conditions may be varied for different clients of the SP system 104. A single client may also specify different SLA conditions for different digital services provided by the SP system 104, or by the SP system 104 and one or more other SPs.

Some types of monitoring data that may be used to form one or more SLA conditions include but are not limited to: resource metrics, utilization metrics, saturation metrics, error metrics, and availability metrics. Resource metrics may vary based on resource type. Some resources, for example, are "low-level" such as a server's resources including physical components such as CPU, memory, disks, network interfaces, etc. Resource metrics offer a detailed description of a system's state. Utilization metrics may include the percentage of time that a particular resource is busy, or the percentage of the resource's capacity that is in use for a given time period. Saturation metrics may include a measure of the amount of requested work that a resource cannot yet service. Error metrics may include internal errors that may not be observable in the work a resource produces. Availability metrics may include the percentage of time that a resource responded to requests. In some embodiments, availability metrics are limited to use with well-defined resources that can be actively and regularly checked for availability.

To make the most efficient use of space restrictions on the distributed ledger implemented by distributed ledger monitoring system 106, monitoring data items for a given time period may be aggregated into batches. For example, all monitoring metrics for a ten-minute aggregation period may be assembled into one message or monitoring envelope that is sent or published to the distributed ledger.

Figure 6:
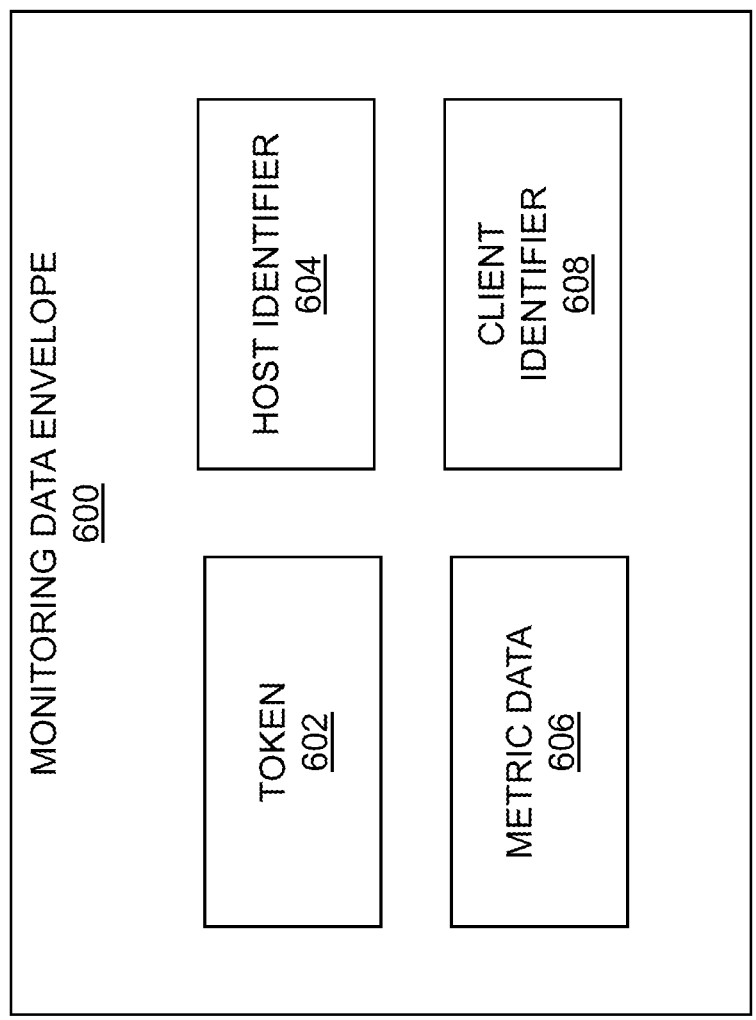
FIG. 6 shows a monitoring data envelope used to report monitoring metrics in an illustrative embodiment.

FIG. 6 illustrates the structure of a monitoring data envelope 600 which may be used in some embodiments. The monitoring data envelope 600 includes a token 602 (e.g., an HOTP token as described above), a host identifier 604 (e.g., an identifier of the SP system 104, virtual computing resource instance 341, etc.), monitoring metric data 606 (e.g., resource metrics, utilization metrics, saturation metrics, error metrics, availability metrics, etc.) and a client identifier 608 (e.g., an identifier of the client device 102, a particular user thereof, etc.).

In the resource release phase 404, the monitoring metrics provided to the validating smart contract (e.g., SLA contract 361) are parsed. The SLA contract 361 is responsible for verifying that the monitoring data meets the SLA conditions agreed to by the client device 102, and for triggering release of the conditional payment to the SP system 104 responsive to such verification. A number of options are available, which may be suited for use based on the level of trust in the relationship between the client device 102 and SP system 104.

In some embodiments, funds provided by a user of the client device 102 are pre-paid in advance, and held by the SP system 104 in a segregated client account. The validating smart contract and escrow smart contract functions would then trigger release of a portion of these funds from the client account to the SP system 104 in response to verifying that the monitoring data meets the agreed-upon SLA conditions. This approach may be suitable in situations where the relationship between the user of the client device 102 and the SP system 104 is characterized by a long-term mutual trust relationship, and where the identities of both parties are known. Such relationships are typical of enterprise-customer relationships. In this situation, requiring an advance payment may not present a barrier to the client. In this case, the escrow smart contract may be executed on the distributed ledger monitoring system 106 (e.g., rather than a separate escrow system 108), and there would be no requirement for a public cryptocurrency network (though the transfer of funds may be in the form of a public cryptocurrency if so desired).

In other embodiments, the system is designed to support payments in an untrusted relationship (e.g., using a public cryptocurrency). This approach may be suitable for situations where a short-term lease of computing resources is required, and minimal information is required to be known about the counterparties. In this variant, the user of client device 102 does not need to trust the SP system 104 by providing a payment directly to the SP system 104, but instead makes the initial conditional payment to the escrow smart contract 381 operating on a separate escrow system 108, which may be a public cryptocurrency network.

Advantageously, embodiments enable real-time conditional payments for IaaS and other types of cloud and digital services. Accurate and fair real-time payments provides clear benefits both to clients and SPs. Some embodiments provide a solution which guarantees fair exchange between clients and SPs by programmatically defining SLAs and delegating validation of the SLAs and payment transfer to distributed ledger smart contracts.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for monitoring quality of services provided by cloud service providers using a distributed ledger will now be described in greater detail with reference to FIGS. 7 and 8. Although described in the context of system 100, these platforms may also be used to implement at least portions of other information processing systems in other embodiments.

Figure 7:
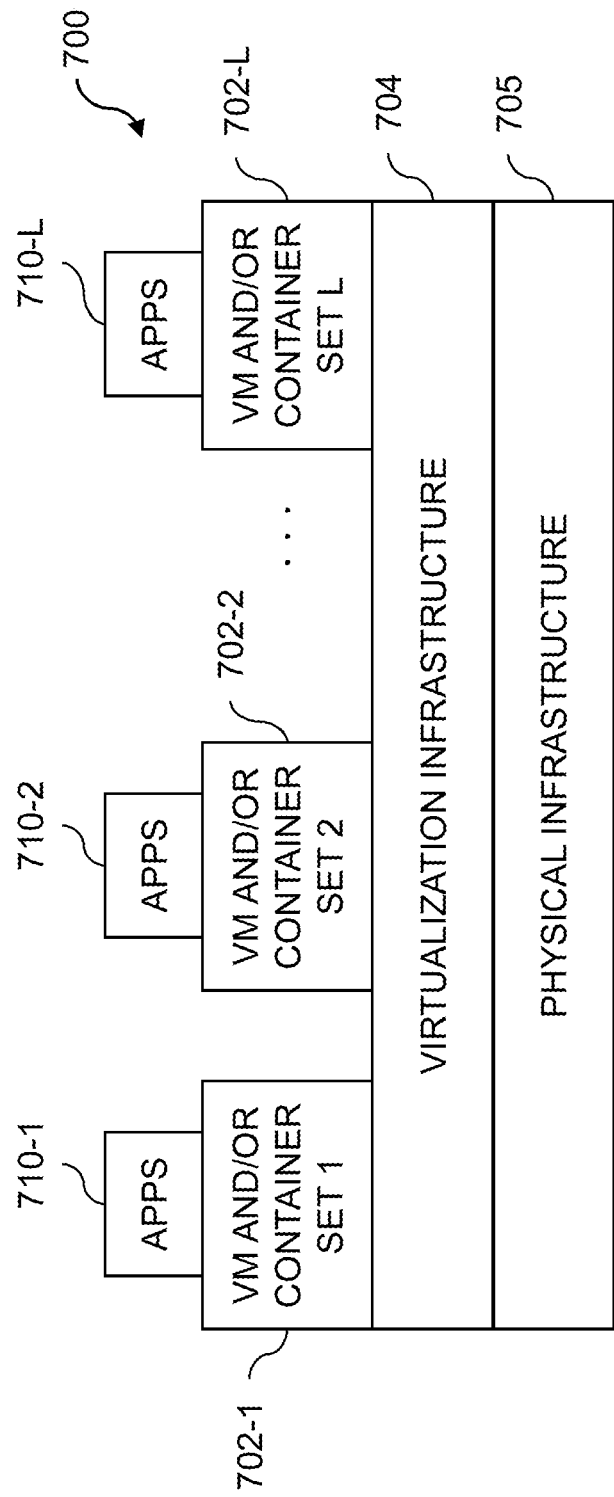
FIGS. 7 and 8 show examples of processing platforms that may be utilized to implement at least a portion of an information processing system in illustrative embodiments.
Figure 8:
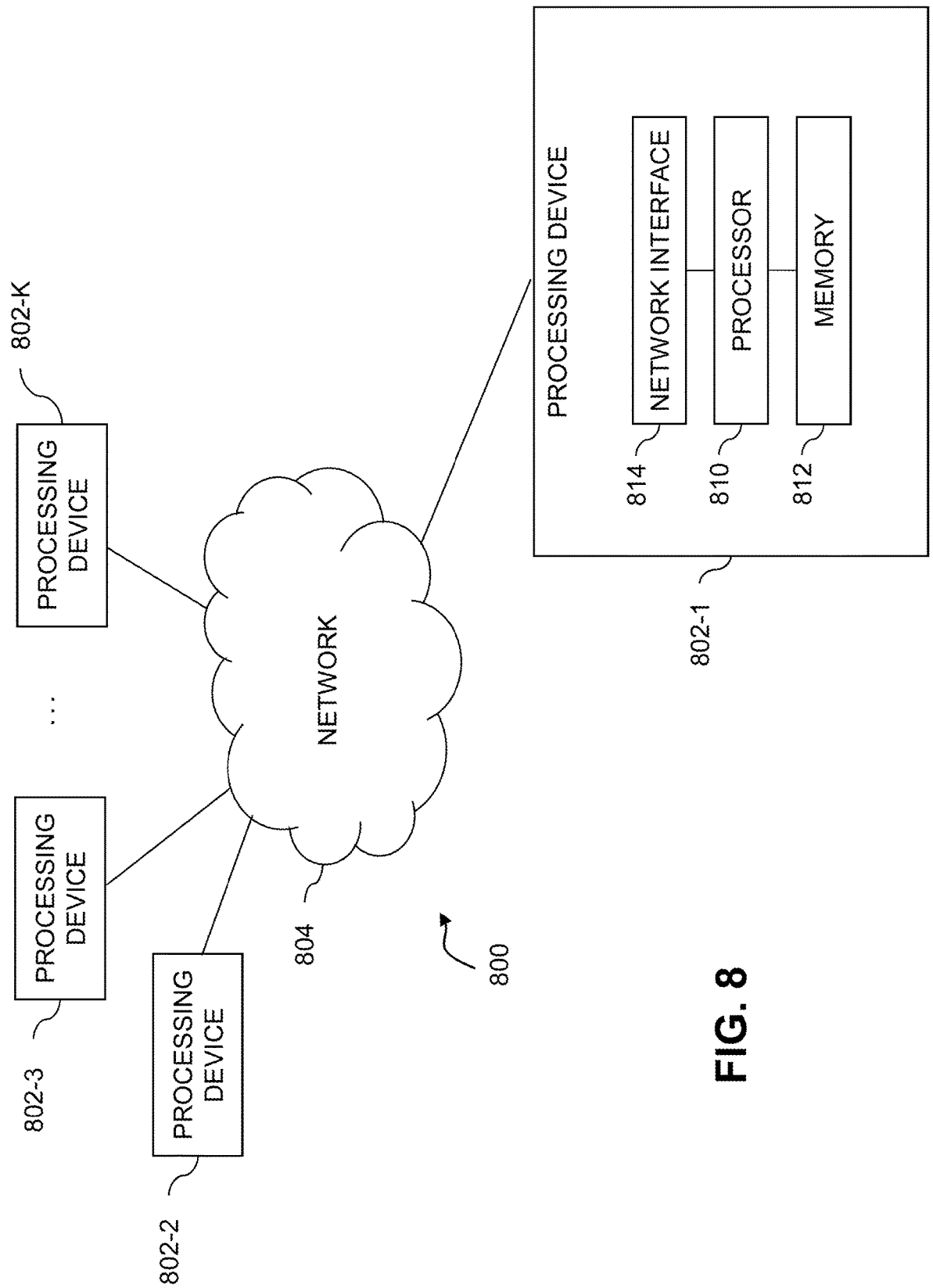

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple VMs and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. An example of a hypervisor platform that may be used to implement a hypervisor within the virtualization infrastructure 704 is the VMware® vSphere® which may have an associated virtual infrastructure management system such as the VMware® vCenter™. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for monitoring quality of services provided by cloud service providers using a distributed ledger as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, digital services, distributed ledgers, token types, SLAs, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
wherein the processing device is configured to implement a first ledger node of a plurality of ledger nodes configured to collectively maintain a distributed ledger for monitoring quality of service provided by one or more cloud service providers;
the first ledger node being configured:
to obtain a set of quality of service metrics for a given workload running on a given one of the cloud service providers;
to receive, from a client agent running on at least one virtual computing resource instance of the given cloud service provider, a set of monitoring metrics for the given workload operating on the at least one virtual computing resource instance;
to generate a cryptographic block characterizing the set of monitoring metrics, the cryptographic block being entered into the distributed ledger collectively maintained by the plurality of ledger nodes;
to verify (i) whether the given workload meets the set of quality of service metrics based at least in part on the set of monitoring metrics and (ii) whether first information received at the first ledger node from the given client device for the given workload running on the given cloud service provider matches second information received at the first ledger node from the client agent for the given workload running on the at least one virtual computing resource instance of the given cloud service provider; and
to trigger release of one or more resources from a given client device to the given cloud service provider responsive to successful verification (i) that the given workload meets the set of quality of service metrics, and (ii) that the first information received at the first ledger node from the given client device for the given workload running on the given cloud service provider matches the second information received at the first ledger node from the client agent for the given workload running on the at least one virtual computing resource instance of the given cloud service provider.

2. The apparatus of claim 1 wherein the distributed ledger comprises a blockchain distributed ledger maintained on a peer-to-peer basis without utilizing a centralized transaction authority.

3. The apparatus of claim 1 wherein the given workload comprises an Infrastructure-as-a-Service (IaaS) cloud service provided by the given cloud service provider.

4. The apparatus of claim 3 wherein the IaaS cloud service comprises the at least one virtual computing resource instance, the at least one virtual computing resource instance comprising at least one of:
one or more virtual machine instances; and
one or more application container instances.

5. The apparatus of claim 1 wherein:
the first information comprises a first one-time passcode token for the given workload received at the first ledger node from the given client device;
the second information comprises a second one-time passcode token for the given workload received at the first ledger node from the client agent; and
verifying that the first information received from the given client device for the given workload running on the given cloud service provider matches the second information received from the client agent for the given workload running on the at least one virtual computing resource instance of the given cloud service provider comprises verifying that the first one-time passcode token matches the second one-time passcode token prior to triggering the release of the one or more resources from the given client device to the given cloud service provider.

6. The apparatus of claim 5 wherein the first one-time passcode token and the second one-time passcode token comprise respective hash-based message authentication codes (HMACs) generated utilizing an HMAC-based one-time passcode algorithm utilizing a secret key.

7. The apparatus of claim 6 wherein the secret key is provisioned in the client agent and is not known to the given cloud service provider.

8. The apparatus of claim 1 wherein triggering the release of the one or more resources from the given client device to the given cloud service provider comprises triggering release of a conditional payment, the conditional payment being provided to an escrow smart contract prior to execution of the given workload on the given cloud service provider.

9. The apparatus of claim 8 wherein the conditional payment comprises a hash-locked transaction of a given cryptocurrency.

10. The apparatus of claim 8 wherein the first ledger node is further configured to trigger return of the one or more resources to the given client device responsive to at least one of:
expiration of a designated time period; and
unsuccessful verification that the given workload meets the set of quality of service metrics.

11. The apparatus of claim 1 wherein the monitoring metrics comprise at least one of:
resource metrics describing a state of a given set of resources utilized to implement the at least one virtual computing resource instance, the given set of resources comprising one or more compute, storage and networking resources of the given cloud service provider;
utilization metrics describing at least one of: a percentage of time that the given set of resources are in use; and a percentage of a capacity of the given set of resources that are in use;
saturation metrics describing an amount of requested work that the given set of resources has not yet serviced;
error metrics describing internal errors of the given set of resources; and
availability metrics describing a percentage of time that the given set of resources responded to one or more requests.

12. The apparatus of claim 1 wherein the set of monitoring metrics is received in a monitoring data envelope, the monitoring data envelope aggregating monitoring data for the at least one virtual computing resource instance for a designated period of time.

13. The apparatus of claim 12 wherein the monitoring data envelope comprises:

an identifier of at least one of the given service provider and the at least one virtual computing resource instance;
an identifier of at least one of the given client device and a user of the given client device;
the set of monitoring metrics; and
a one-time passcode token generated by the client agent based on a secret key shared with the given client device, the secret key not being known to the given cloud service provider.

14. A method comprising:
implementing a first ledger node of a plurality of ledger nodes configured to collectively maintain a distributed ledger for monitoring quality of service provided by one or more cloud service providers;
obtaining, in the first ledger node, a set of quality of service metrics for a given workload running on a given one of the cloud service providers;
receiving, at the first ledger node from a client agent running on at least one virtual computing resource instance of the given cloud service provider, a set of monitoring metrics for the given workload operating on the at least one virtual computing resource instance;
generating, in the first ledger node, a cryptographic block characterizing the set of monitoring metrics, the cryptographic block being entered into the distributed ledger collectively maintained by the plurality of ledger nodes;
verifying, in the first ledger node, (i) whether the given workload meets the set of quality of service metrics based at least in part on the set of monitoring metrics and (ii) whether first information received at the first ledger node from the given client device for the given workload running on the given cloud service provider matches second information received at the first ledger node from the client agent for the given workload running on the at least one virtual computing resource instance of the given cloud service provider; and
triggering release of one or more resources from a given client device to the given cloud service provider responsive to successful verification (i) that the given workload meets the set of quality of service metrics, and (ii) that the first information received at the first ledger node from the given client device for the given workload running on the given cloud service provider matches the second information received at the first ledger node from the client agent for the given workload running on the at least one virtual computing resource instance of the given cloud service provider;
wherein the method is performed by at least one processing device comprising a processor coupled to a memory.

15. The method of claim 14 wherein the set of monitoring metrics is received in a monitoring data envelope, the monitoring data envelope aggregating monitoring data for the at least one virtual computing resource instance for a designated period of time.

16. The method of claim 15 wherein the monitoring data envelope comprises:
an identifier of at least one of the given service provider and the at least one virtual computing resource instance;
an identifier of at least one of the given client device and a user of the given client device;
the set of monitoring metrics; and
a one-time passcode token generated by the client agent based on a secret key shared with the given client device, the secret key not being known to the given cloud service provider.

17. A computer program product comprising a non-transitory processor-readable storage medium having stored therein program code of one or more software programs, wherein the program code when executed by at least one processing device causes the at least one processing device:
to implement a first ledger node of a plurality of ledger nodes configured to collectively maintain a distributed ledger for monitoring quality of service provided by one or more cloud service providers;
to obtain, in the first ledger node, a set of quality of service metrics for a given workload running on a given one of the cloud service providers;
to receive, at the first ledger node from a client agent running on at least one virtual computing resource instance of the given cloud service provider, a set of monitoring metrics for the given workload operating on the at least one virtual computing resource instance;
to generate, in the first ledger node, a cryptographic block characterizing the set of monitoring metrics, the cryptographic block being entered into the distributed ledger collectively maintained by the plurality of ledger nodes;
to verify, in the first ledger node, (i) whether the given workload meets the set of quality of service metrics based at least in part on the set of monitoring metrics and (ii) whether first information received at the first ledger node from the given client device for the given workload running on the given cloud service provider matches second information received at the first ledger node from the client agent for the given workload running on the at least one virtual computing resource instance of the given cloud service provider; and
to trigger release of one or more resources from a given client device to the given cloud service provider responsive to successful verification (i) that the given workload meets the set of quality of service metrics, and (ii) that the first information received at the first ledger node from the given client device for the given workload running on the given cloud service provider matches the second information received at the first ledger node from the client agent for the given workload running on the at least one virtual computing resource instance of the given cloud service provider.

18. The computer program product of claim 17 wherein the set of monitoring metrics is received in a monitoring data envelope, the monitoring data envelope aggregating monitoring data for the at least one virtual computing resource instance for a designated period of time.

19. The computer program product of claim 18 wherein the monitoring data envelope comprises:
an identifier of at least one of the given service provider and the at least one virtual computing resource instance;
an identifier of at least one of the given client device and a user of the given client device;
the set of monitoring metrics; and
a one-time passcode token generated by the client agent based on a secret key shared with the given client device, the secret key not being known to the given cloud service provider.

20. The computer program product of claim 17 wherein:

the first information comprises a first one-time passcode token for the given workload received at the first ledger node from the given client device;

the second information comprises a second one-time passcode token for the given workload received at the first ledger node from the client agent; and verifying that the first information received from the given client device for the given workload running on the given cloud service provider matches the second information received from the client agent for the given workload running on the at least one virtual computing resource instance of the given cloud service provider comprises verifying, in the first ledger node, that the first one-time passcode token matches the second one-time passcode token prior to triggering the release of the one or more resources from the given client device to the given cloud service provider.

\* \* \* \* \*